United States Patent
Parnell, Sr. et al.

(10) Patent No.: US 6,708,397 B2
(45) Date of Patent: Mar. 23, 2004

(54) INLAY STATION WITH ALIGNMENT ASSEMBLIES AND TRANSFER TUBES

(75) Inventors: Phillip K. Parnell, Sr., Jacksonville, FL (US); David Dolan, Jacksonville Beach, FL (US); Richard W. Abrams, Jacksonville, FL (US); Michael F. Widman, Jacksonville, FL (US); Ronaldus Joannes Cornelis Maria Kok, Eindhoven (NL); Edwin van Doorn, Escondido, CA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/925,403

(22) Filed: Aug. 9, 2001

(65) Prior Publication Data

US 2003/0029030 A1 Feb. 13, 2003

(51) Int. Cl.[7] .......................... B23P 19/00; B23P 21/00; B65H 1/00
(52) U.S. Cl. .......................... 29/822; 29/771; 414/806; 414/222.01; 414/222.04
(58) Field of Search .......................... 29/822, 771, 809; 414/800, 806, 807, 222.01, 222.04, 222.05, 222.07, 222.11, 222.12, 223.02

(56) References Cited

U.S. PATENT DOCUMENTS

| | | |
|---|---|---|
| 3,831,778 A | 8/1974 | Biber |
| 4,565,348 A | 1/1986 | Larsen |
| 4,640,489 A | 2/1987 | Larsen |
| 5,080,839 A | 1/1992 | Kindt-Larsen |
| 5,238,388 A | 8/1993 | Tsai |
| 5,326,505 A | 7/1994 | Adams et al. |
| 5,394,988 A | 3/1995 | Edwards et al. |
| 5,395,558 A | 3/1995 | Tsai |
| 5,474,166 A | * 12/1995 | Santandrea et al. ...... 198/345.3 |
| 5,540,410 A | 7/1996 | Lust et al. |
| 5,540,543 A | 7/1996 | Lust et al. |
| 5,545,366 A | 8/1996 | Lust et al. |
| 5,561,970 A | 10/1996 | Edie et al. |
| 5,573,715 A | 11/1996 | Adams et al. |
| 5,578,331 A | * 11/1996 | Martin et al. ................ 425/445 |
| 5,593,620 A | 1/1997 | Galas |
| 5,640,980 A | 6/1997 | Keene et al. |
| 5,648,024 A | 7/1997 | Galas |

(List continued on next page.)

FOREIGN PATENT DOCUMENTS

| | | |
|---|---|---|
| EP | 0637491 A | 2/1995 |
| EP | 0691195 A | 1/1996 |
| EP | 1184158 A1 | 6/2002 |
| GB | 1092749 A | 11/1965 |
| WO | WO 98/32587 A2 | 7/1998 |

OTHER PUBLICATIONS

Marketing CD on the Light Stream Process for producing CibaVision Contact Lenses. European Produced Documentary on B&L Factory.

Primary Examiner—John C. Hong (57) ABSTRACT

In a soft contact lens manufacturing process, an injection molding machine (IMM) produces many thermoplastic injection molded front curve (FC) and back curve (BC) mold parts, each of which mold parts is subsequently used only once to mold a single soft contact lens. An inlay station with alignment assemblies and transfer tubes provide for the precise transfer to and alignment of the FC and BC molds in pallets during their transfer from the IMM to pallets on an assembly line in a high speed automated commercial production operation. A rotatable FC transfer arm and a rotatable BC transfer arm transfer the FC and BC molds from the IMM machine to the pallets in an inlay station. The precisely aligned transfer is provided by two alignment rods of an alignment assembly which pass through two alignment apertures in the pallet and then pass through two alignment apertures in one of the FC or BC alignment arms.

23 Claims, 8 Drawing Sheets

U.S. PATENT DOCUMENTS

| | | |
|---|---|---|
| 5,649,410 A | 7/1997 | Martin et al. |
| 5,679,385 A | 10/1997 | Adams et al. |
| 5,681,138 A | 10/1997 | Lust et al. |
| 5,690,866 A | 11/1997 | Andersen et al. |
| 5,690,973 A | 11/1997 | Kindt-Larsen et al. |
| 5,693,268 A | 12/1997 | Widman et al. |
| 5,702,735 A | 12/1997 | Martin et al. |
| 5,706,634 A | 1/1998 | Edwards et al. |
| 5,716,540 A | 2/1998 | Matiacio et al. |
| 5,744,357 A * | 4/1998 | Wang et al. ............ 425/347 |
| 5,759,318 A | 6/1998 | Galas |
| 5,762,081 A | 6/1998 | Keene et al. |
| 5,776,514 A | 7/1998 | Wu et al. |
| 5,836,323 A | 11/1998 | Keene et al. |
| 5,861,114 A | 1/1999 | Roffman et al. |
| 5,895,192 A | 4/1999 | Parnell, Sr. et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 6,007,229 A | 12/1999 | Parnell, Sr. et al. |
| 6,012,471 A | 1/2000 | Calvin et al. |
| 6,071,112 A | 6/2000 | Calvin et al. |
| 6,071,440 A | 6/2000 | Wang et al. |
| 6,077,031 A | 6/2000 | Lust et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,207,086 B1 | 3/2001 | Schlagel et al. |
| 6,368,522 B1 | 4/2002 | Ansell et al. |

\* cited by examiner

INLAY STATION WITH ALIGNMENT ASSEMBLIES AND TRANSFER TUBES

BACKGROUND OF THE INVENTION

1. Field of the Invention

The present invention relates generally to an inlay station with alignment assemblies and inlay tubes, and more particularly pertains to an inlay station with alignment assemblies and transfer tubes which provide for the precise location and alignment of front curve (FC) and back curve (BC) molds in pallets after their transfer from an injection molding machine (IMM) machine on an assembly line in a high speed automated commercial production operation.

2. Discussion of the Prior Art

In a typical prior art soft contact lens manufacturing process, metal inserts are used in an injection molding machine (IMM) in an injection molding process to produce many thermoplastic injection molded front curve (FC) molds and back or base curve (BC) molds, each of which FC and BC molds is subsequently used only once to mold a single soft hydrogel contact lens. In this process, the thermoplastic FC and BC mold halves are subsequently joined in the course of the soft contact lens production process to form a mold cavity. The mold cavity formed by the injection molded FC and BC molds is then filled with monomer which is polymerized to form a lens, which is then removed from the mold and further processed to yield the final soft hydrogel lens product. The FC and BC molds may be manufactured from any thermoplastic material which is capable of being injection molded and which provides the final cast lens with the required optical properties, with preferred materials for mold frames being polystyrene and polypropylene. To injection mold the FC and BC molds, metal tool inserts of the required configuration are machined and mounted in the injection molding machine. The injection molded FC and BC molds are exact inverse reproductions of the metal mold inserts, and the resultant molded contact lenses are exact reproductions of the metal mold inserts.

SUMMARY OF THE INVENTION

Accordingly, it is a primary object of the present invention to provide an inlay station with alignment assemblies and transfer tubes which provide for the precise location and alignment of the FC and BC molds in pallets after their transfer from an injection molding machine (IMM) machine on an assembly line in a high speed automated commercial production operation.

BRIEF DESCRIPTION OF THE DRAWINGS

The foregoing objects and advantages of the present invention for an inlay station with alignment assemblies and transfer tubes may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE INVENTION

Figure 1:
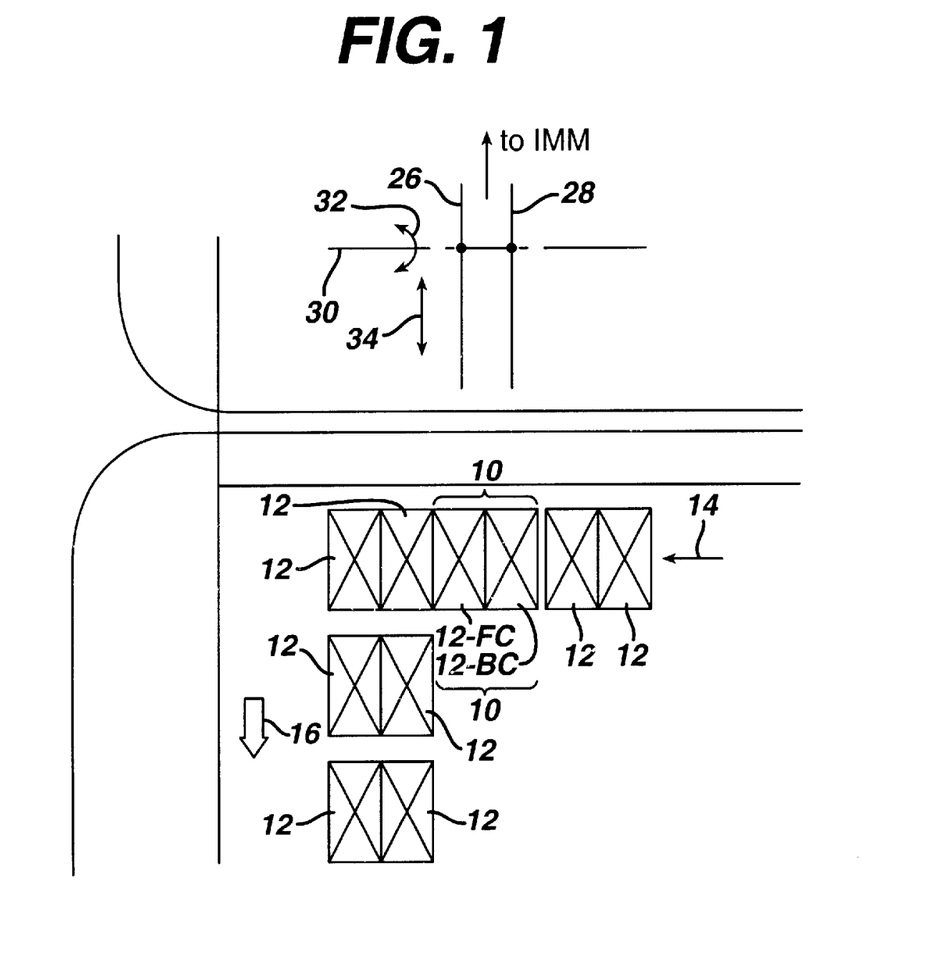
FIG. 1 is an overview of the inlay station of the subject invention which transfers front curve (FC) molds and base or back curve (BC) molds from an injection molding machine (IMM) in which they are molded to pallets which support and align the front curve (FC) and base curve (BC) molds on a conveyor system.

FIG. 1 is an overview of the inlay station 10 of the subject invention which transfers front curve (FC) molds and base or back curve (BC) molds from an injection molding machine (IMM) in which they are molded on one side of the inlay station (above the inlay station as viewed in FIGS. 1 and 2—see the arrow pointing To IMM) to pallets 12, which support and align the front curve (FC) molds and base curve (BC) molds, on a conveyor system which advances the pallets into and through the inlay station.

Figure 2:
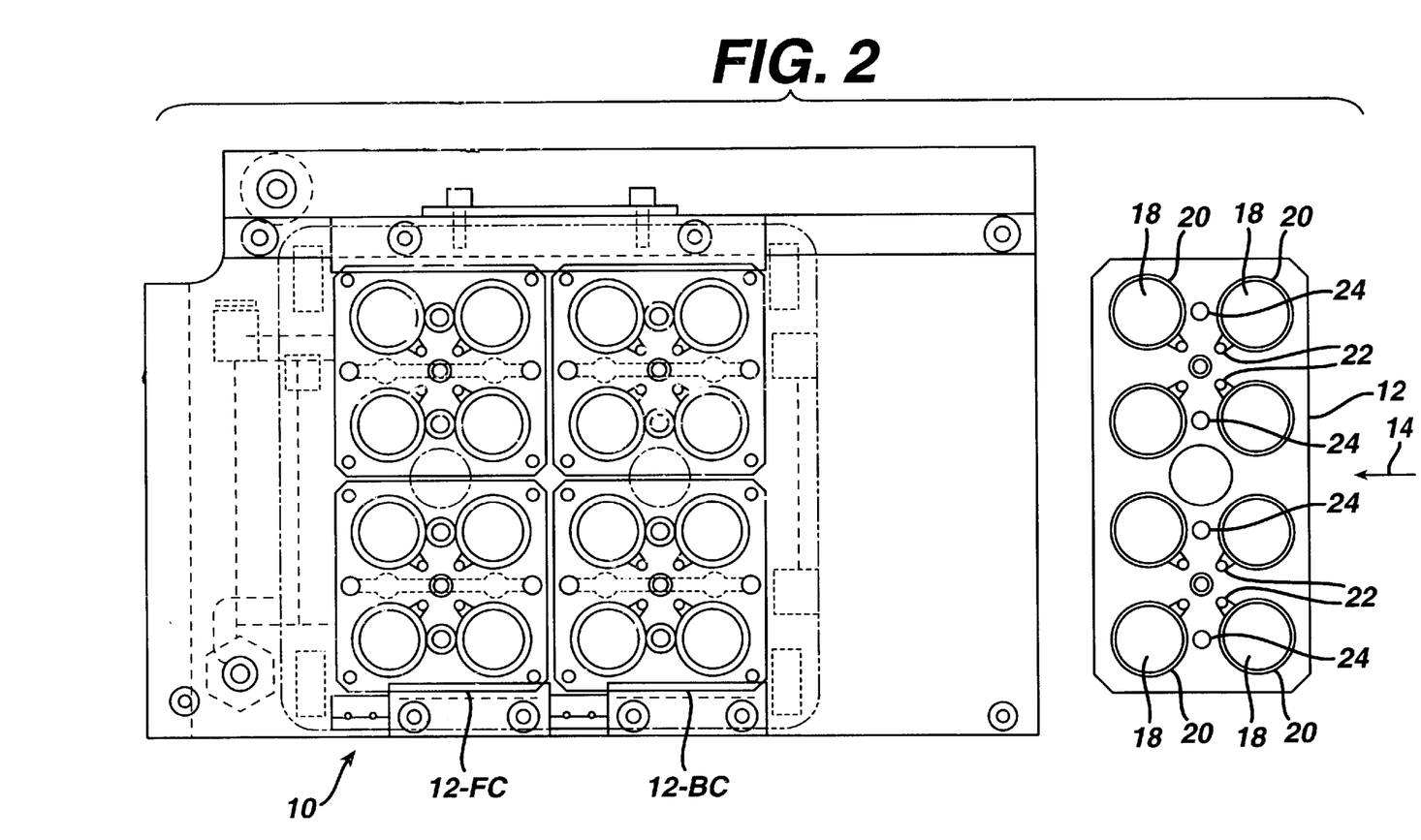
FIG. 2 is a top plan view of a pair of FC and BC pallets situated in the inlay station, and the right side of FIG. 2 illustrates in phantom a top view of one of the pallets having a 2×4 array of generally cylindrical cavities which support the FC or BC molds.

Referring to FIGS. 1 and 2, a FC pallet 12-FC and a BC pallet 12-BC are advanced to the left along arrow 14 into the inlay station where they are loaded respectively with FCs and BCs, and then they are advanced further to the left out of the inlay station, before being advanced downwardly along arrow 16 by the conveyor system.

FIG. 2 is a top plan view of a pair of pallets 12-FC, 12-BC situated in the inlay station 10. The right side of FIG. 2 illustrates in phantom a top view of one of the pallets 12, and shows a 2×4 array of generally cylindrical cavities 18 with top support flanges 20 extending circumferentially therearaound. Each pallet is rectangular in shape and supports a 2×4 array of either front curve (FC) molds or base curve (BC) molds in an array of 2×4 cylindrical cavities therein. Each cavity includes a generally cylindrical void 18 with an annular flange 20 formed around the upper edge of the cylindrical void, such that a mold is supported at its generally circular outer edge by the annular flange. Each support flange includes a small V shaped depression 22 extending toward the center of a 4×4 cluster of the support cavities which supports and aligns a projecting tab on each of the FC and BC molds to precisely align the mold therein. It should be appreciated that some of the FC and BC molds must be angularly aligned as they are not symmetrical in shape because they are used to mold asymmetrical contact lenses such as toric contact lenses designed to correct for astigmatism. Four circular alignment holes 24 extend vertically through the pallet, with two holes being adjacent to each 2×2 cluster of support cavities, and the four alignment holes are used to precisely align the pallet in the inlay station.

Two side by side pallets are advanced into the inlay station on a conveyor system, and the left pallet shown in FIGS. 1 and 2 is loaded with an array of 2×4 FC molds, and the right pallet shown in FIGS. 1 and 2 is loaded with an array of 2×4 BC molds in the inlay station. The loaded pallets are then advanced out of the inlay station (to the left as viewed in FIGS. 1 and 2) and replaced by another pair of side by side pallets (from the right as viewed in FIGS. 1 and 2), and the operation is repeated continuously in a high speed automated commercial production line to transfer FC and BC molds from the IMM in which they are molded to pallets on a conveyor system. The FC and BC molds are subsequently used to mold soft hydrogel contact lenses in a molding operation in which a pair of FC and BC molds is used only once to mold a single contact lens and is then disposed of.

It should be appreciated that the precise location and alignment of the FC and BC molds in the pallets after their transfer from the IMM machine on an assembly line in a high speed automated commercial operation can be a problem. The present invention for an inlay station with alignment assemblies and inlay transfer tubes was designed specifically to address that problem.

As shown schematically in FIG. 1, a rotatable FC transfer arm 26 and a rotatable BC transfer arm 28, which rotate about an axis 30 extending generally parallel to the top of FIG. 1, as indicated by circular arrow 32, are used to transfer the FC and BC molds from the IMM machine to the pallets in the inlay station, as described in greater detail hereinbelow. The FC transfer arm 26 and BC transfer arm are also supported on a common translatable support to be translatable along an axis 34 to pick up the FCs and BCs from the IMM machine and deposit them in the pallets 12.

Pick up/placement heads 36 and 38 at the outer end of each of the FC and BC transfer arms 26 and 28 transfer a 2×2 array of FCs and BCs at one time. In the loading process, first the two 2×2 clusters shown on the bottom of the two pallets, as viewed in FIGS. 1 and 2, are loaded with molds, and then the FC and BC transfer arms are translated upwardly, as viewed in FIGS. 1 and 2, along arrow 34, and secondly the two 2×2 clusters shown on the top of the two pallets, as viewed in FIGS. 1 and 2, are loaded with molds.

Figure 3:
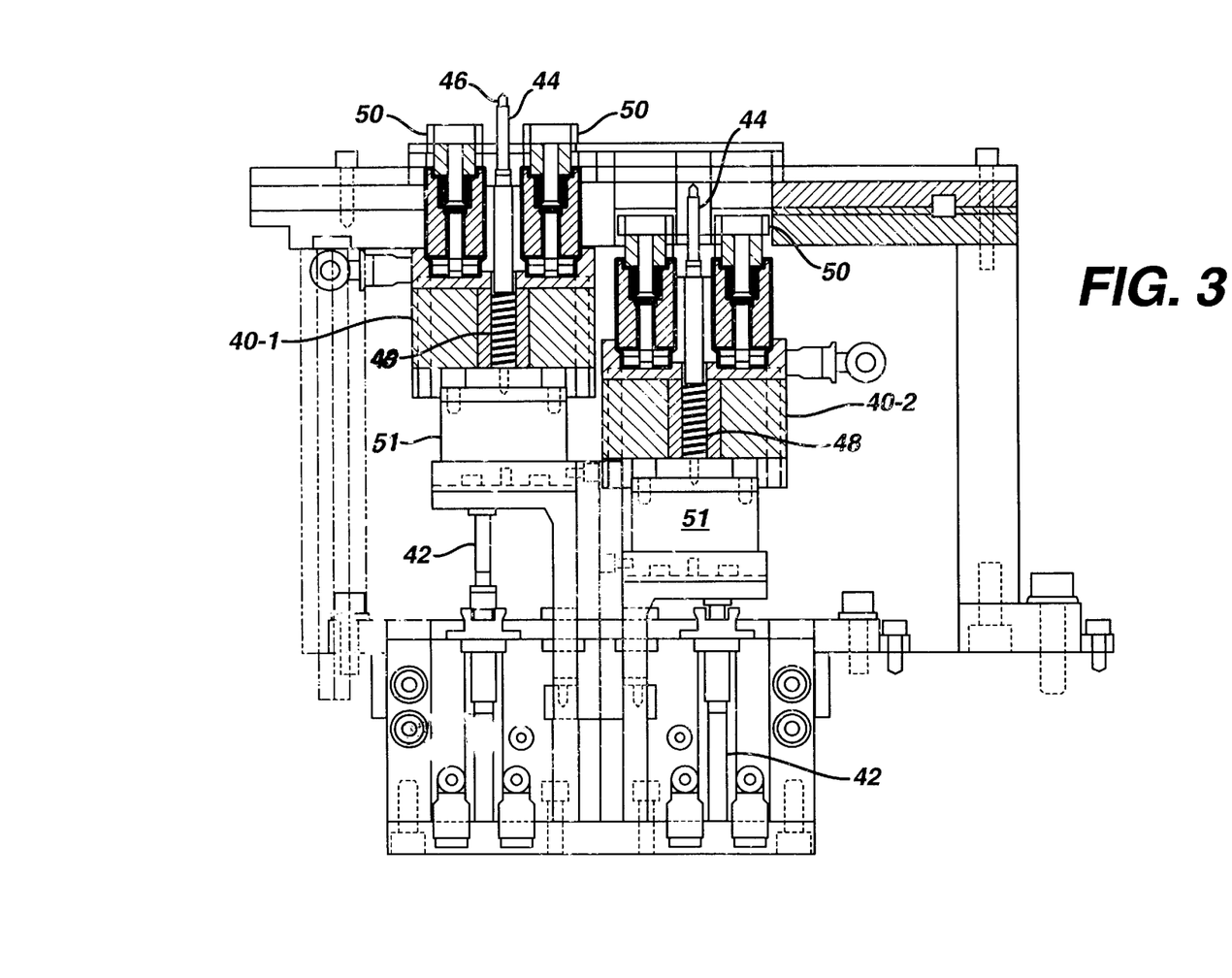
FIG. 3 is a front elevational view of the inlay station of FIG. 2, and illustrates how each pallet is aligned and loaded in the inlay station with the aid of four vertically reciprocating alignment and inlay tube assemblies, with FIG. 3 illustrating the front left assembly for the left pallet in a raised position and the front right assembly for the right pallet in a lowered recessed position.

FIG. 3 is a front elevational view of the inlay station of FIG. 2, and illustrates further details thereof. Each pallet is aligned and loaded in the inlay station with the aid of four vertically reciprocating alignment and inlay tube assemblies 40, with FIG. 3 illustrating the front left assembly 40-1 for the left pallet in a raised position and illustrating the front right assembly 40-2 for the right pallet in a lowered recessed position.

Figure 4:
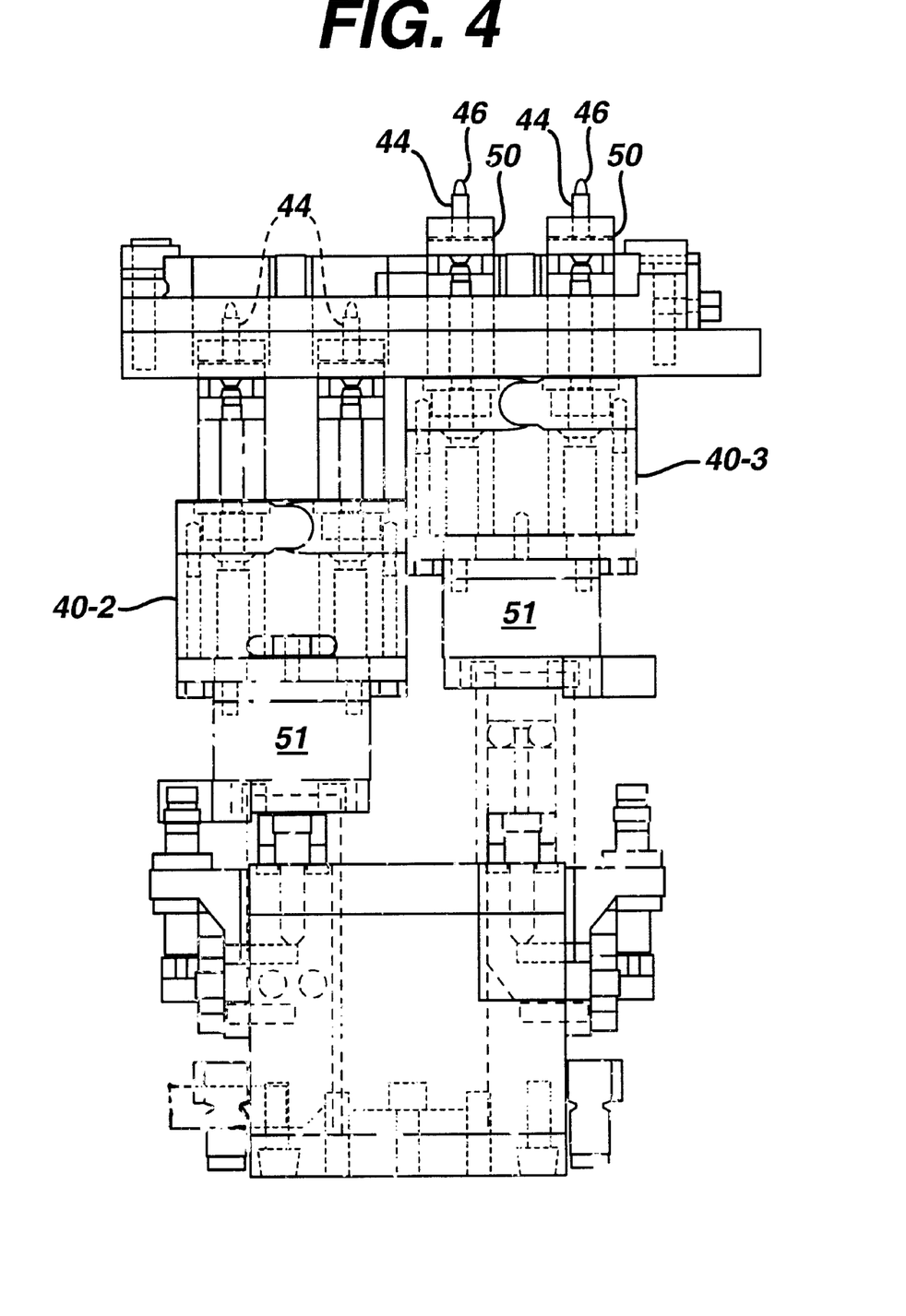
FIG. 4 is a side elevational view of the inlay station of FIG. 3, and illustrates the right front (as viewed in FIG. 3) assembly in a lowered position, and illustrates the right rear (as viewed in FIG. 3) assembly in a raised position.

FIG. 4 is a side elevational view of the inlay station of FIG. 3, and illustrates the right front (as viewed in FIG. 3) assembly 40-2 in a lowered position, and illustrates the right rear (as viewed in FIG. 3) assembly 40-3 in a raised position. Each of the four assemblies is raised and lowered in a reciprocating manner by a separate pneumatic actuator 42.

Each alignment and inlay tube assembly 40 includes two vertically extending alignment rods 44 having generally frusto-conical tops 46 which are raised upwardly after the pair of pallets enter and are roughly aligned in the inlay station. The two rising alignment rods pass through the two alignment holes 24 for each 2×2 cluster of support cavities in each pallet to more precisely align the pallet with the alignment rod in the inlay station. Each alignment rod is spring 48 mounted in a cylindrical cavity in the main body of each assembly to provide a limited amount of resiliency thereto.

Figure 5:
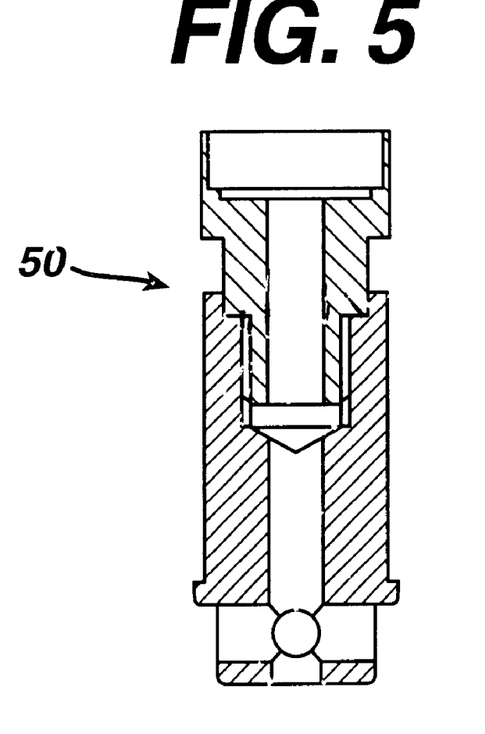
FIG. 5 is an enlarged view of one of the inlay tubes, the exterior diameter of which is slightly smaller than the exterior diameter of a cylindrical cavity in the pallet, and which defines a central vacuum duct which enables a vacuum to be applied therethrough to a mold being transferred by the inlay tube.

Each assembly 40 includes a 2×2 array of inlay tubes 50, one of which is shown in further detail in FIG. 5, which are raised and lowered through a 2×2 array of cylindrical cavities 18 in the pallet to assist in removing the FC and BC molds from a placement head 36 and 38 which holds an array of 2×2 molds at the end of each of the rotatable FC transfer arm and the rotatable BC transfer arm. The 2×2 array of inlay tubes 50 aid in lowering and precisely positioning and aligning the molds in the array of 2×2 mold cavities in the pallet.

Each assembly 40 also includes a generally cylindrically shaped compliance module 51, which is commercially available from SMC corporation, positioned immediately above the pneumatic actuator 42. The compliance module is a compliant assembly which allows limited x, y translational and rotational movements between its lower surface, which is adjacent to the pneumatic actuator 42, and its upper surface, which supports the assembly of the spring mounted alignment rod 44 and the 2×2 array of inlay tubes 50. The compliance module allows limited aligning movements in each assembly 40 to allow each alignment rod 44 to align first with an alignment aperture 24 in a pallet and then with an alignment aperture 39 in a transfer arm (which is considered to be the reference alignment position, to which the positions of the pallet 12 and alignment rods 44 are adjusted and aligned) as the assembly is raised from its lower position to its upper position by the pneumatic actuator.

Figure 6:
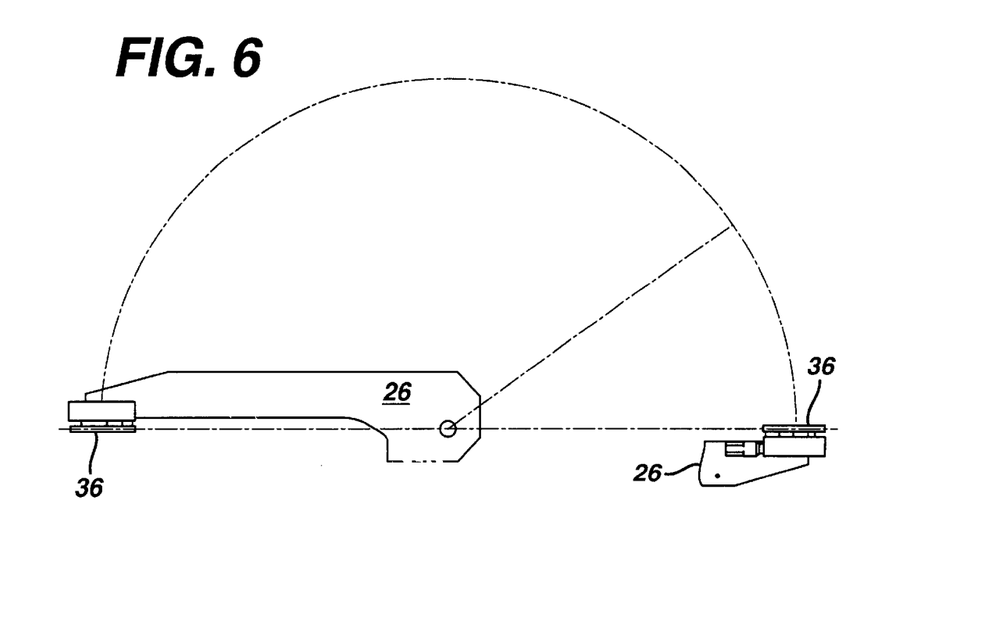
FIGS. 6 and 7 are front elevational views of respectively the FC transfer arm and the BC transfer arm, and illustrate the rotational travel paths of both transfer arms wherein each of the FC and BC transfer arms carries a pick up/placement head at its outer extremity which functions to pick up an array of respectively FC or BC molds.
Figure 7:
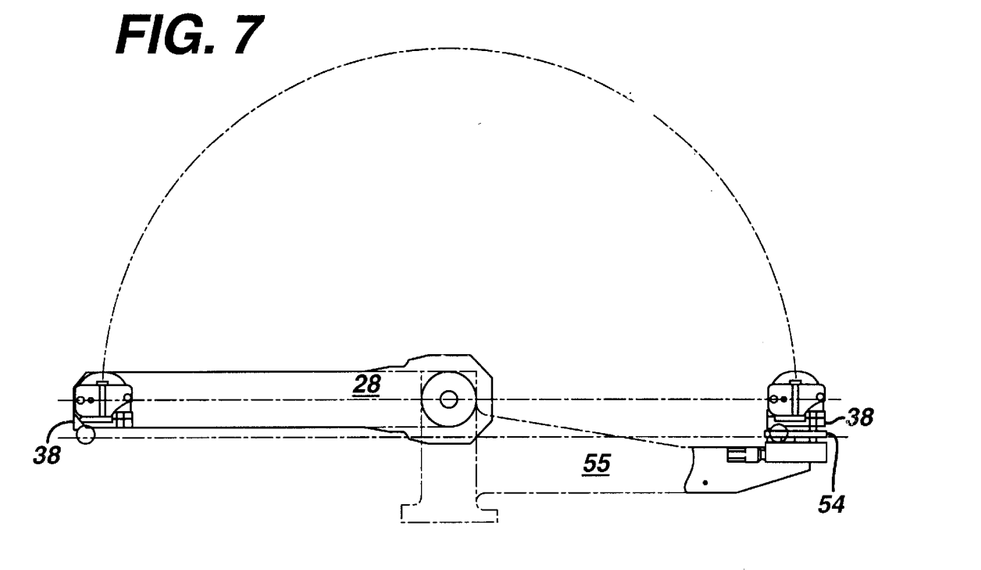

FIGS. 6 and 7 are front elevational views of respectively the FC transfer arm and the BC transfer arm, and illustrate the rotational travel paths of both transfer arms. Each of the FC and BC transfer arms 26 and 28 carries a pick up/placement head 36 and 38 at its outer extremity which functions to pick up a 2×2 array of respectively FC or BC molds.

The right side of FIG. 6 illustrates the FC placement head 36 facing upwardly in a position in which an array of 2×2 FC molds are received from the IMM on the upper surface of the placement head. The array of 2×2 FC molds are secured thereto and held by an array of 2×2 individual holders and vacuum ducts in the FC placement head.

The right side of FIG. 7 illustrates the BC placement head facing downwardly in a position in which an array of 2×2 BC molds are received from the upper surface of a BC holder nest 54 held on a stationary BC holder arm 55. The 2×2 array of BC molds which are received by the downwardly facing BC placement head 38 are secured thereto and held by an array of 2×2 individual holders and vacuum ducts in the BC placement head.

The right side of FIG. 8 also illustrates the upwardly facing FC placement head 36 and the 2×2 array of mold holders and the two circular alignment apertures 39 which are engaged by two alignment rods in a manner as described in further detail hereinbelow. The right side of FIG. 8 also illustrates the upwardly facing BC holder nest 54 and the 2×2 array of mold holders thereon.

Figure 9:
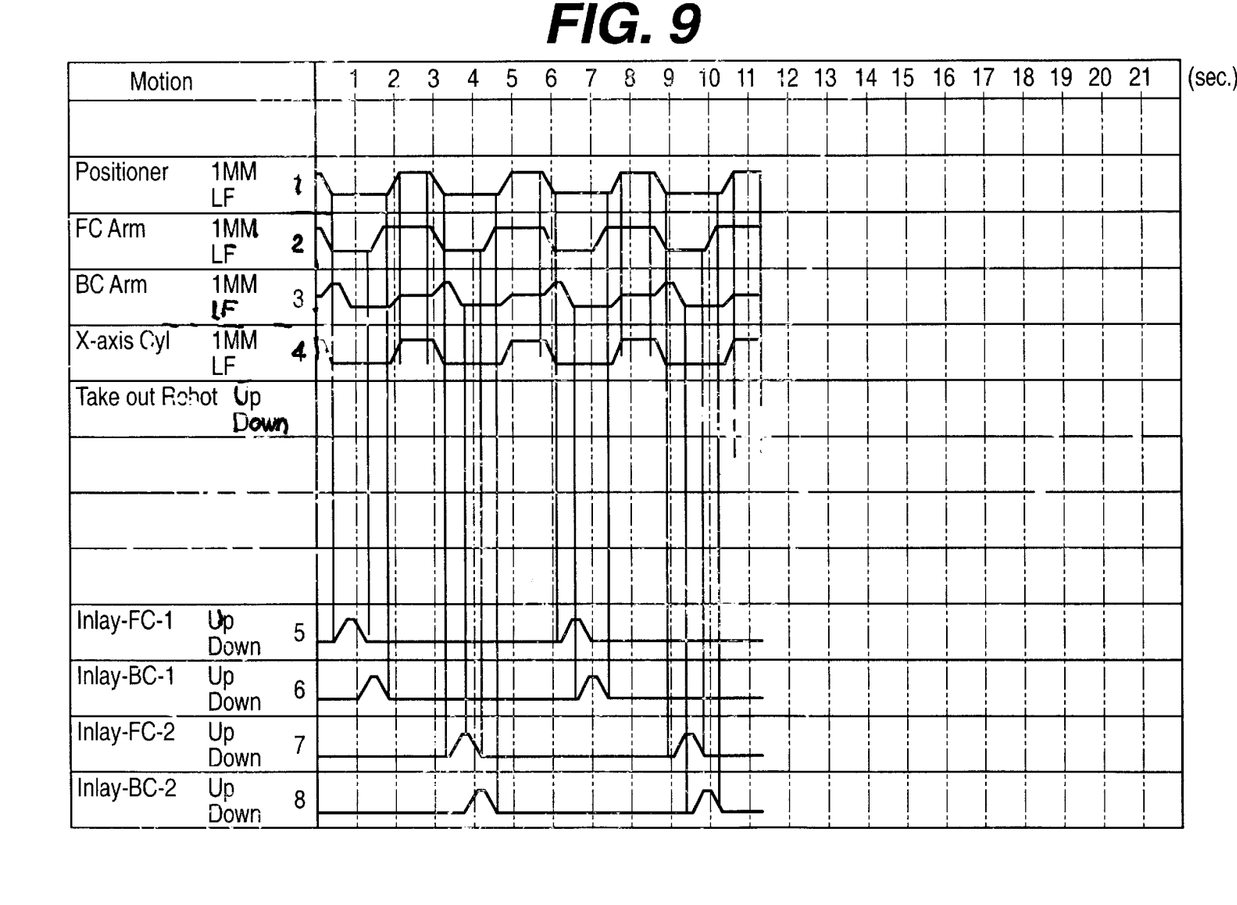
FIG. 9 illustrates displacement versus time charts for respectively the IMM positioner, the FC transfer arm, the BC transfer arm, the x-axis cylinder, and the four inlays FC-1, BC-1, FC-2 and BC-2.

FIG. 9 illustrates displacement versus time charts for the FC transfer arm, the BC transfer arm, and the four inlays FC-1, BC-1, FC-2, and BC-2. The FC and BC transfer arms 36 and 38 operate in synchronized sequence, with the FC transfer arm being slightly advanced in timing relative to the BC transfer arm, to first load a 2×2 array of FC molds in the lower half, as viewed in FIGS. 1 and 2, of the FC pallet (FC-1), and secondly load a 2×2 array of BC molds in the lower half of the BC pallet (BC-1). Then the support for the FC and BC transfer arms is translated upwardly along arrow 34, as viewed in FIGS. 1 and 2, and the FC and BC transfer arms thirdly load a 2×2 array of FC molds in the upper half of the FC pallet (FC-2), and fourthly load a 2×2 array of BC molds in the upper half of the BC pallet (BC-2). For each loading sequence of a 2×2 array, each transfer arm is rotated approximately 180 degrees to pick up a 2×2 array of molds from a transfer station in the IMM machine or the BC holder nest 54 and is then rotated approximately 180 degrees to transfer the 2×2 array of molds to a pallet, and then the operation is repeated in sequence as described above. The FC pick up/placement head 36 at the end of the FC transfer arm picks up the 2×2 array of FC molds, concave side down, from a pick up station at the IMM machine, at which they are placed in the pick up/placement head 36. The BC pick up/placement head 38 at the end of the BC transfer arm 28 picks up the 2×2 array of BC molds, concave side up, from the stationary BC holder nest 54 supported by the stationary BC holder arm 55.

After a pair of pallets are initially positioned and roughly aligned in the inlay station, the alignment assemblies 40 are raised in the synchronized sequence described above. In each alignment assembly 40, two alignment rods 44 rise upwardly through two alignment holes 24 in a pallet to more precisely align the pallet 12 relative to the alignment rods 44 in the inlay station. As each assembly 40 continues to rise, the array of inlay tubes rise up into the array of cylindrical cavities 18 in the pallet 12, but do not clear the top of the pallet. At that time, the transfer arm has rotated to a position above the pallet such that the placement head at the end of the transfer arm stops at a position approximately ½ inch above the pallet. The assembly 40 is then raised further such that the array of inlay tubes 50 are raised upwardly through the array of cylindrical cavities 18 and the two alignment rods are raised upwardly into two circular alignment holes 39 in the transfer arm 26 or 28 and lastly the inlay tubes are positioned immediately adjacent to the placement head 36 or 38. The alignment holes 39 in the transfer arm 36 or 38 extend vertically through the placement head 36 or 38 at the end of each transfer arm 36 or 38, as shown in FIG. 8.

The arrangement is such that the two alignment rods, as they are raised upwardly, first align the pallet relative to the alignment assembly 40, and then align the pallet and the alignment assembly relative to the transfer arm. The alignment rods are preferably hardened steel or stainless steel, and the alignment holes in the pallets and transfer arms preferably hardened steel or stainless steel have bushings surrounding the alignment rods. The arrangement of the overall system is such that the FC and BC molds are aligned in the support cavities of the pallet with a tolerance of +/−100 microns.

In each alignment and inlay tube assembly 40, the spring mounted alignment rods 44 therein first align a pallet, by the alignment holes 24 therein, with the alignment rods, and then align the pallet and the alignment rods with the transfer arm 26 or 28, by the alignment holes 39 in the transfer arm, to align the inlay tubes 50 supported by the assembly 40 with the placement head 36 or 38 of the transfer arm 26 or 28. The compliance module 51 allows for limited x/y translations and rotation to precisely align the array of inlay tubes 50 to the placement head 36 or 38 supported on the transfer arm 26 or 28.

The individual FC or BC molds are secured to the FC or BC placement head by individual holders and vacuum ducts, and after the inlay tubes are positioned immediately adjacent to a placement head, the vacuums in the placement head are terminated, and preferably a pressurized shot of air (blow off) is introduced into the vacuum ducts, to release the 2×2 array of molds into the 2×2 array of inlay tubes, and individual vacuums in each of the inlay tubes are turned on to transfer the molds from the placement head to the raised inlay tubes and secure the molds to the raised inlay tubes while not disturbing and preserving the angular alignment of the molds. After the transfer, the vacuum in each inlay tube is checked to ensure that each inlay tube is in fact holding a mold. The assembly 40 is then lowered such that the array of inlay tubes descends into the pallet, and the vacuums in the individual inlay tubes are terminated at the same time to allow the vacuum to dissipate while the inlay tubes are being lowered. When the molds are in a position to be supported by the flanges of the cavities in the pallet, the vacuum can be completely aspirated by a pressurized shot of air (blow off) into the vacuum ducts of the inlay tubes, to release the molds to be supported by the flanges of the cavities of the pallet while not disturbing and preserving the angular alignment of the molds, and the assembly 40 continues downwardly to its fully lowered position.

The alignment rods 44 serve an important alignment function while the inlay tubes are being lowered, in that the alignment rods initially remain aligned within the placement head as the assembly is being initially lowered to maintain all of components in correctly aligned positions until the molds are transferred to their support positions in the pallet, which enables the tight alignment tolerances of the molds in the pallet to be achieved.

FIG. 5 is an enlarged view of one of the inlay tubes 50, the exterior diameter of which is slightly smaller than the exterior diameter of a cylindrical cavity 18. The inlay tube is preferably fabricated of a resin such as polyetheretherketone, known as PEEK, which has a high melting point of approximately 300 degrees C. and is a very durable material. Each inlay tube defines a central vacuum duct 52 which enables a vacuum to be applied therethrough to a mold being transferred by the inlay tube.

The pick up/placement head 36 at the end of the FC transfer arm picks up the 2×2 array of FC molds, concave side down, from a pick up station at the IMM machine. The FC transfer arm then rotates approximately 180 degrees, and the pick up/placement head 36 rotates therewith and then deposits the 2×2 array of FC molds in an inverted position, concave side up, in the FC pallet, as illustrated by FIG. 6.

The BC pick up/placement head 38 at the end of the BC transfer arm 28 picks up a 2×2 array of BC molds, concave side up, from the stationary BC holder 54 at the IMM machine. The BC transfer arm then rotates approximately 180 degrees, and the pick up/placement head then deposits the 2×2 array of BC molds in the same position, concave side up, in the BC pallet. In order to deposit the 2×2 array of BC molds in the same position, concave side up, in the BC pallet, the BC pick/up placement head must remain in the same attitude or orientation while the BC transfer arm rotates 180 degrees. To accomplish this, the BC pick up/placement head must rotate 180 degrees relative to the BC transfer arm while the BC transfer arm rotates 180 degrees.

Figure 8:
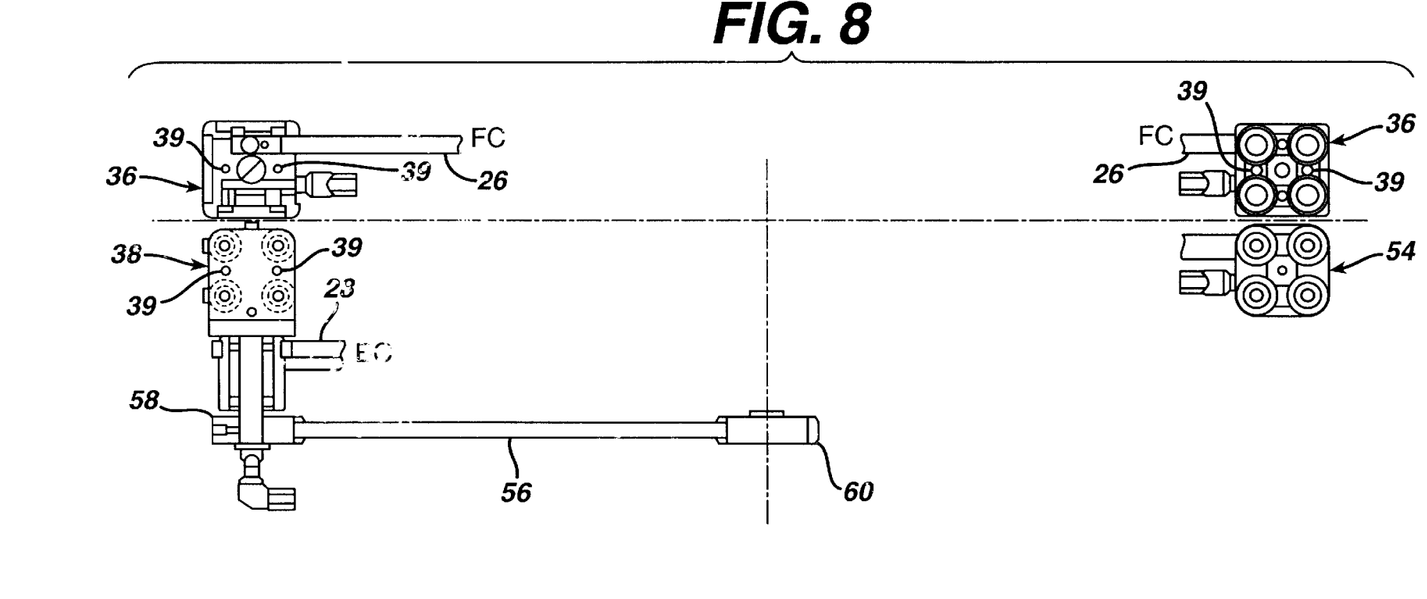
FIG. 8 illustrates the positions of the FC and BC pick up/placement heads at opposite ends of rotation of the FC and BC transfer arms, and illustrates how the BC pick up/placement head is held at a stationary attitude during rotation of the BC transfer arm by a toothed pulley and a toothed belt arrangement such that it does not rotate with the BC transfer arm.

FIG. 8 illustrates a toothed belt 56 and toothed pulley 58 arrangement to accomplish this relative rotation of the BC pick up/placement head 38 relative to the BC transfer arm 28, wherein the belt 56 is held stationary and does not rotate with the BC transfer arm, such as by the belt 56 extending around a stationary mounted pulley 60 mounted on the axis of rotation of the BC transfer arm. The toothed belt 56 extends around the toothed pulley 58 which is mounted to rotate with the pick up/placement head 38. The arrangement is such that as the BC transfer arm rotates, the stationary belt causes the pulley 58, and attached pick up/placement head 38, to rotate relative to the BC transfer arm, and the pick up/placement head remains in the same horizontal orientation, such that it deposits the 4×4 array of BC molds in the same orientation, concave side up, onto the BC pallet.

FIG. 9 illustrates displacement versus time charts for respectively the IMM positioner which translates the support for the FC and BC transfer arms along arrow 34, the FC transfer arm, the BC transfer arm, the x-axis cylinder, and the four inlays FC-1, BC-1, FC-2, and BC-2. The rotations of the FC transfer arm and the BC transfer arm are synchronized with each other, but the FC transfer arm is slightly advanced relative to the BC transfer arm, which allows the FC transfer arm to accomplish its tasks and to clear out of the way before the BC transfer arm accomplishes its tasks and movements.

Referring to the waveforms of FIGS. 9-2 and 9-3, the bottom horizontal portions of the waveforms represent the positions of the transfer arms when the molds are being placed on a pallet, and the top horizontal portions of the waveforms represent the positions of the transfer arms when the molds are being picked up from the IMM. As indicated by FIG. 9-2, the FC transfer arm has basically two positions, an FC mold pick up position and an FC mold placement position. As indicated by FIG. 9-3, the BC transfer arm has basically three positions, a BC mold pick up position, a clearance position in which the BC transfer arm is waiting for the FC transfer arm to complete its tasks and clear out of the way, shown as the intermediate step in FIG. 9-3, and a BC mold placement position. The waveforms of FIGS. 9-5 through 9-8 have already been explained hereinabove.

While several embodiments and variations of the present invention for an inlay station with alignment assemblies and transfer tubes are described in detail herein, it should be apparent that the disclosure and teachings of the present invention will suggest many alternative designs to those skilled in the art.

Having thus described our invention, what we claim as new and desire to secure by Letters Patent is:

1. An arrangement for transferring items from a first station on an assembly line to a second station on the assembly line, comprising:
   a rotationally mounted transfer arm for rotating and transferring items from the first station on the assembly line to the second station on the assembly line, the transfer arm having an alignment aperture;
   a receptacle for receiving the transferred items at the second station on the assembly line, the receptacle having an alignment aperture;
   means for precisely aligning the receptacle with the transfer arm at the second station, after the transfer arm has rotated from the first station to the second station, including a reciprocating alignment assembly having an alignment rod at the second station, which aligns the receptacle with the alignment assembly by passing the alignment rod through the alignment aperture in the receptacle, and then aligns the receptacle and the alignment assembly with the transfer arm by passing the alignment rod through the alignment aperture in the transfer arm, to precisely align the receptacle with the transfer arm at the second station.

2. The arrangement of claim 1, wherein the alignment assembly is mounted for reciprocating vertical movement at the second station.

3. The arrangement of claim 1, wherein the transfer arm includes first and second alignment apertures which are aligned with first and second alignment apertures in the receptacle by first and second alignment rods of the alignment assembly passing through the first and second alignment apertures in the receptacle and then passing through the first and second alignment apertures in the transfer arm.

4. The arrangement of claim 1, wherein the receptacle comprises a pallet which defines an array of individual openings for receiving an array of individual items.

5. The arrangement of claim 4, including:
   a plurality of alignment assemblies;
   first and second transfer arms, each of which is rotationally reciprocated between the first station and the second station, and each of which includes first and second alignment apertures which are aligned with first and second alignment apertures in a pallet by first and second alignment rods of an alignment assembly passing through the first and second alignment apertures in the pallet and then passing through the first and second alignment apertures in one of the first and second alignment rods.

6. The arrangement of claim 4, in an inlay station which transfers molds from an injection molding machine in which the molds are molded to pallets which support and align the molds on a conveyor system which advances the pallets into and through the inlay station.

7. The arrangement of claim 6, wherein a first front curve transfer arm transfers front curve molds to a front curve pallet and a second back curve transfer arm transfers back curve molds to a back curve pallet.

8. The arrangement of claim 4, wherein each pallet is rectangular and supports a rectangular array of molds in a rectangular array of cylindrical cavities therein, and each cavity includes a generally cylindrical void having a circumferential upper edge with an annular flange formed around the circumferential upper edge of the cylindrical void, such that a mold is supported by said annular flange.

9. The arrangement of claim 7, wherein the conveyor system advances first and second pallets into the inlay station, the first pallet is loaded with an array of front curve molds, and the second pallet is loaded with an array of back curve molds, and each pallet is aligned in the inlay station by at least one vertically reciprocating alignment assembly.

10. The arrangement of claim 9, wherein each alignment assembly includes two vertically extending alignment rods having generally pointed tips which are raised upwardly after the pallet enters and is roughly aligned in the inlay station, and the rising alignment rods pass through the alignment holes in the pallet to more precisely align the pallet with the alignment rods and then pass through two alignment holes in one of the transfer arms to more precisely align the pallet and alignment assembly with the transfer arm.

11. The arrangement of claim 6, wherein each alignment assembly includes an array of transfer tubes which is raised and lowered through an array of cylindrical cavities in the pallet to assist in removing the molds from a placement head which holds an array of molds at the end of said rotationally mounted transfer arm, and the array of transfer tubes is raised upwardly through the array of cylindrical cavities until the transfer tubes are positioned adjacent to e placement head.

12. The arrangement of claim 11, wherein individual molds are secured to the placement head by individual vacuums which are terminated to release the array of molds into the raised array of transfer tubes, and individual vacuums in each of the transfer tubes are turned on to transfer the molds from the placement head to the raised array of transfer tubes.

13. The arrangement of claim 12, wherein after release of the molds from the placement head, the alignment assembly is lowered such that the array of transfer tubes descends into the pallet, and the vacuums in the individual transfer tubes are terminated to allow the molds to be supported in the cavities in the pallet.

14. The arrangement of claim 13, wherein as the transfer tubes are being lowered, the alignment rod initially remains aligned within the transfer arm as the alignment assembly is being initially lowered to maintain the pallet, the alignment assembly and the transfer arm in correctly aligned positions until the molds are transferred to the cavities in the pallet.

15. The arrangement of claim 1, wherein each alignment assembly includes a compliance module which allows limited x/y translations and rotation within the alignment assembly to align the receptacle with the transfer arm.

16. An arrangement for transferring an array of items from a placement head to a pallet comprising:

a placement head for receiving an array of items, the placement head having an alignment aperture;

a pallet for receiving the array of items transferred from the placement head, the pallet having an alignment aperture;

means for precisely aligning the pallet with the placement head, including a vertically reciprocating alignment assembly having an alignment rod which aligns the pallet with the placement head by passing the alignment rod through the alignment aperture in the pallet and then through the alignment aperture in the placement head, to precisely align the pallet with the placement head;

the alignment assembly include an array of transfer tubes which is raised and lowered through an array of cavities in the pallet to assist in transferring the items from the placement head to the pallet, wherein the array of transfer tubes is raised upwardly through the array of cavities until the transfer tubes are positioned adjacent to the placement head, and the items are then transferred from the placement head to the transfer tubes;

after transfer of the items to the transfer tubes, the alignment assembly is lowered such that the array of transfer tubes descends into the pallet, and as the transfer tubes are being lowered, the alignment rod initially remains aligned with the placement head as the alignment assembly is initially lowered to maintain the pallet in correctly aligned relative to the placement head until the items are transferred to the pallet.

17. The arrangement of claim 16, wherein the placement head includes first and second alignment apertures which are aligned with first and second alignment apertures in the pallet by first and second alignment rods of the alignment assembly passing through the first and second alignment apertures in the pallet and then passing through the first and second alignment apertures in the placement head.

18. The arrangement of claim 16, wherein said array of items are molds transferred from an injection molding machine.

19. The arrangement of claim 16, wherein each pallet is rectangular and supports a rectangular array of items which are molds in a rectangular array of cylindrical cavities therein, and each cavity includes a generally cylindrical void with an annular flange formed around a circumferential upper edge of the cylindrical void, such that the mold is supported at its generally circular outer edge by an annular flange.

20. The arrangement of claim 16, wherein the alignment assembly includes two vertically extending alignment rods having generally pointed tips which are raised upwardly, and pass through the alignment rods holes in the pallet to more precisely align the pallet with the alignment rods and then pass through alignment holes in the placement head to more precisely align the pallet and the alignment assembly with the placement head.

21. The arrangement of claim 16, wherein individual items are secured to the placement head by individual vacuums which are terminated to release the array of items into the raised array of transfer tuber, and individual vacuums in each of the transfer tubes are turned on to transfer the items from the placement head to the raised array of transfer tubes.

22. The arrangement of claim 21, wherein after release of the items from the placement head, the alignment assembly is lowered such that the array of transfer tubes descends into the pallet, and the vacuums in the individual transfer tubes are terminated to allow the items to be supported in correctly aligned positions in cavities in the pallet.

23. The arrangement of claim 16, wherein the alignment assembly includes a compliance module which allows limited x/y translations and rotation within the alignment assembly to align the pallet with the placement head.

* * * * *